United States Patent [19]

Ahlbom

[11] Patent Number: 4,530,057
[45] Date of Patent: Jul. 16, 1985

[54] DEVICE FOR STEERING A STEERABLE WHEELED VEHICLE

[75] Inventor: Sten H. N. Ahlbom, Västra Frölunda, Sweden

[73] Assignee: AB Volvo, Sweden

[21] Appl. No.: 626,466

[22] Filed: Jun. 29, 1984

[30] Foreign Application Priority Data

Oct. 2, 1980 [SE] Sweden ............................ 8006905

[51] Int. Cl.³ ........................ G05B 19/36; G08G 9/00
[52] U.S. Cl. .................................. 364/424; 180/168; 318/587
[58] Field of Search ............. 364/424, 436, 444, 449, 364/450, 559; 180/167–169, 98; 318/587; 340/23, 24, 73, 178 R

[56] References Cited

U.S. PATENT DOCUMENTS

| 3,009,525 | 11/1961 | De Liban | 180/168 |
| 3,612,206 | 10/1971 | Ohntrup | 180/168 |
| 3,638,751 | 2/1972 | Moll et al. | 180/168 |
| 3,714,625 | 1/1973 | Fayling | 180/167 |
| 3,715,572 | 2/1973 | Bennett | 180/169 |
| 3,925,641 | 12/1975 | Kashio | 364/424 |
| 3,984,806 | 10/1976 | Tyler | 364/450 |
| 4,040,500 | 8/1977 | Blakeslee | 180/168 |
| 4,044,853 | 8/1977 | Melke | 180/167 |
| 4,083,422 | 4/1978 | Blakeslee et al. | 180/168 |
| 4,278,142 | 7/1981 | Kono | 364/424 |
| 4,307,791 | 12/1981 | De Bruine | 180/168 |
| 4,310,789 | 1/1982 | Mank et al. | 180/168 |
| 4,329,632 | 5/1982 | Yoshida et al. | 364/436 |

Primary Examiner—Eddie P. Chan
Assistant Examiner—John G. Mills
Attorney, Agent, or Firm—Pollock, Vande Sande & Priddy

[57] ABSTRACT

In steering a wheeled vehicle along a path marked on the supporting surface, a single linear detector is used which is rigidly mounted in the vehicle perpendicular to the principal direction of movement of the vehicle. As the vehicle moves, the position of the path in the transverse field of view of the detector is measured repeatedly, in the form of lateral deviations $\Delta x$, simultaneously with the distances $s_1, s_2 \ldots$ in the direction of movement between successive lateral deviation measurements. The deviation between the direction of the path marked and the path actually travelled by the vehicle is thus obtained, in the form of a lateral deviation $\Delta x$, and an attitude deviation $\phi = (\Delta x_2 - \Delta x_1)/s_1$. These two deviation variables will make possible corrective steering of the vehicle to the marked path.

1 Claim, 3 Drawing Figures

DEVICE FOR STEERING A STEERABLE WHEELED VEHICLE

This application is a continuation of application Ser. No. 307,698, filed Oct. 1, 1981, now abandoned.

The invention relates to a method for steering a steerable wheeled vehicle, there being arranged, on the surface supporting the vehicle at least somewhere along its intended path, a linear path marking, and there being arranged in the vehicle detector means for detecting the path marking, as well as means for measuring distance travelled. The invention also relates to a device for applying the method.

It has been previously suggested to arrange floor markings along which a self-propelled vehicle can be caused to roll. As a rule, up to now markings consisting of electrical loops have been used in which alternating current is conducted. Coils in the vehicle can then sense the loops and the vehicle can be made to follow the loops. The normal procedure has been to have a detector unit mounted in the front of the vehicle, and a deviation, which is detected by the signal from the loop being received more strongly in one of the two coils placed on either sides of the centreline of the vehicle, is corrected by causing the vehicle to turn in towards the loop. Such a steering system, which can function well per se, has the disadvantage that the vehicle can only be steered forwards, since steering with steering principles known up to now is only stable if the sensor device is in front of the vehicle. It has thus been necessary in these known devices to mount a sensor device on both ends of the vehicle, if it is to be driven both forwards and backwards.

As a rule, such systems have a connection between a sensor and a steer wheel, so that the wheel is turned towards the path in the direction of motion so as to correct the movement of the vehicle. In this case, the sensor must be made movable in relation to the vehicle, which can cause difficulties, for example with regard to available space. To be driven both backwards and forwards, the vehicle must in this case be provided with a steered wheel with sensor both in the front and back to provide a steered wheel in front of unsteered wheels as seen in the direction of movement.

SUMMARY OF THE INVENTION

The purpose of the invention is to achieve a steering system which makes possible the use of a vehicle-fixed sensor for instantaneous measurement of lateral deviation of the vehicle relative to the path, along a line transverse to the vehicle, and which still makes steering possible under stable conditions.

This is achieved according to the invention by using, in a method described above in the introduction, a single linear detector, rigidly mounted in the vehicle essentially perpendicular to the principal direction of movement of the vehicle. The deviation of the linear marking from an index point in the linear detector is determined, and this is a measure of the lateral deviation. As the vehicle moves, there are measured firstly, at least two lateral deviations, and secondly, a distance between the positions of the vehicle at the points in time of the measurement of lateral deviation, whereafter an attitude deviation for the vehicle in relation to the path marking is computed by dividing the difference between the lateral deviations by the distance travelled between measuring said deviations.

It is preferable to measure at least three successive lateral deviations and the intermediate distances, so as to provide two different attitude deviations. This may provide an over-determination, if the vehicle is following the marking, or can determine the curvature of the vehicle movement. It is also possible to compute a steering variable as a linear function of the last attitude deviation and the last lateral deviation.

According to a special aspect of the invention, the steering variable can also be a linear function of the corrected values for normalized rolled-off distances, of both the difference between two attitude deviations ($\phi$) and the difference between two lateral deviations ($\Delta x$). Such an attitude deviation can replace an attitude deviation for the vehicle computed by dead reckoning. What is meant by dead reckoning is the sort of calculation of the position and attitude of the vehicle based on a measurement of rolled-off distances by means of two fixed measuring wheels or a pivoting measuring wheel which determines both direction and distance, or the like. As revealed in my Swedish patent application No. 7900993-2, such measurements make vehicle steering possible without a physical path, and the invention can in this case be used to update the steering data for the position and attitude of the vehicle with actual measured values by alternating steering without physical path with path steering.

The invention also relates to a steerable wheeled vehicle for use in the inverted method, which comprises steering means, means for determining distance travelled, computing means and detector means for detecting a path marking. According to the invention, the detector means comprise a linear detector arranged essentially perpendicular to the principal forward direction of the vehicle, means for computing a distance between an index point in the detector and the point of intersection between the path marking and the detector, memory means for storing this distance as a lateral deviation, means for storing the distance between two positions of the vehicle, at which lateral deviation measurements are carried out, means for computing the difference between two lateral deviations, and means for normalizing this difference with respect to the two respective positions of the vehicle, to obtain a value for the attitude of the vehicle.

According to the invention, it is suitable to arrange the linear detector on the longitudinal centreline of the vehicle, i.e. on the line of symmetry and perpendicular thereto. Technical conditions such as steering geometry, control functions, response times of the steering arrangement and space considerations will determine where the linear detector should be placed to produce stable steering with good precision at the speeds to be used. The same linear detector can suitably be used to steer the vehicle both forwards and backwards.

According to a special aspect of the invention, the steering can be regarded as being analogous to the type of steering one would have in a car if one were forced to steer the car along a line marked on the underlying surface on the basis of what the driver can observe of the line through a slot made in the floor perpendicular to the orientation of the vehicle and so narrow that the direction of the line in relation to the vehicle cannot be instantaneously determined. It is thus not possible for the driver to determine how he should steer on the basis of a single observation, when the vehicle is standing still. Rather, he must allow the vehicle to move in order to determine how the line moves in the slot where he can observe it.

FIG. 1 shows schematically how the intended steering principle can be embodied. A lone L is marked on a floor on which the vehicle is to be driven. The vehicle is provided with a linear detector, schematically represented as D, which is rigidly mounted in the vehicle perpendicular to its forward direction of movement. The centre point or index point I of the linear detector describes, as the vehicle moves, a curve, the projection of which on the floor forms the curve T. At a first position shown, the detector finds that the marking L is at a distance $\Delta x_1$ from the index point I. The vehicle rolls further, and the rolled-off distance is measured, e.g. by a measuring wheel rolling against the floor, and after the distance $s_1$ a new measurement is made, with the result that the lateral error has now been changed to $\Delta x_2$, this time with an opposite sign. After rolling off the distance $s_2$, a new measurement is made with the result $\Delta x_3$, also with an opposite sign to the first measurement.

From the first two measurements it is possible to determine the attitude of the vehicle (relative to the orientation of the marking) as an average, by the expression $$\phi_1 = \frac{\Delta x_2 - \Delta x_1}{s_1} \quad (1)$$

The last two measurements provide a new value for the attitude of the vehicle, which is different if the vehicle moves on a curved path:

$$\phi_2 = \frac{\Delta x_3 - \Delta x_2}{s_3}$$

For greater accuracy, it is possible to use instead of equation (1) the expression $$\phi_1 = \sin^{-1}\left(\frac{\Delta x_2 - \Delta x_1}{s_1}\right) \quad (c)$$

The steerable wheels of the vehicle should now be activated so that $\phi$ and $\Delta x$ approach zero. If sufficiently frequent measurements are made, one can make the assumption that the index point I, which is here identical with the midpoint of the linear detector, follows a circular arc, and that the radius of curvature of the vehicle is virtually constant between three measurements. It is possible to set up a steering equation to compute a setting for a steered wheel for returning the vehicle to follow the path L. It is assumed that at a certain moment the vehicle is found to have the attitude $\phi_2$, that the preceding attitude was $\phi_1$, and that the prevailing lateral deviation is $\Delta x_3$. A suitable steering setting $\delta$ can then be computed from the following equation:

$$\delta = a\phi_2 + b\frac{\phi_2 - \phi_1}{\Delta t_3} + c\Delta x_3 + d\frac{\Delta x_3 - \Delta x_2}{\Delta t_3} + e\phi_2 \quad (2)$$

$e = e_o$ if $\Delta x_3$ and $\phi_2$ have the same sign
$e = o$ otherwise in which $\Delta t_3$ is the time for covering the distance $s_3$ in FIG. 1. The time-dependent factors provide stable movement at higher speeds, where inertial forces must be taken into account.

By allowing the value of e to be non-zero only when $\phi_2$ and $\Delta x_3$ have the same sign, $\phi_2$ is given added weight over $\Delta X_3$ in that case, which makes the curve-following more stable. The reason for this is that in this case, swinging-in towards the line will initially involve an increase in $\Delta x$, which must be given less weight to provide optimum steering-in. Without such compensation, the swinging-in process would be slow.

A corresponding compensation can occur if $\Delta x$ is relatively large and $\phi$ is small but has an opposite sign. This is due to the fact that, with suitable normalization of $\phi$ and $\Delta x$, a should be given a larger weighting factor than c in equation (2). For the case where $\Delta x$ is relatively significant and $\phi$ is small, the swinging-in will start with an initially increasing $\phi$.

It is apparent that the steering carried out here is much more complicated than in previously known track-following systems where a lateral error is observed and this error directly affects the steer wheel setting. By taking into account both attitude and lateral errors, it is possible to obtain better path follwing, despite the fact that the actual sensing system is more simple.

The linear detector use can be an optical detector, and in this case what is intended is a unit consisting of a row of photodiodes, onto which a slot-shaped surface on the floor is projected by means of optical instrument components such as lenses and mirrors. Thus the light-sensitive photodiodes each read an individual portion of the slot-shaped detection area, and it is preferable to use a commercially available diode arrangement where the response signal of the diodes can be read in series, thus facilitating computerized reading. Such a system of optical lines makes the construction of a path very simple.

If one wishes to use electromagnetic markings instead, this is also possible. A conductor is arranged in the floor in a known manner, and emits electromagnetic signals by alternating current being led through it. The linear detector can then consist of two receiving coils (antennae) placed on either side of the longitudinal centreline of the vehicle. When the two coils receive equally strong signals, $\Delta x$ is zero, while $\Delta x$ differs more or less from zero if one coil senses the signals more strongly than the other. This also provides a quantitative measure of $\Delta x$, albeit as a rule with somewhat poorer precision that that which is possible with optical sensing of a painted line. It is also possible to work analogously with passive electromagnetic markings such as permanent-magnetic elements, magnetic tape etc. if the positions thereof are designed to be measured more or less quantitatively along a linear detector suited thereto.

The invention will now be described with reference to a nonlimiting embodiment shown in the figures.

DESCRIPTION OF THE PREFERRED EMBODIMENT

Figure 1:
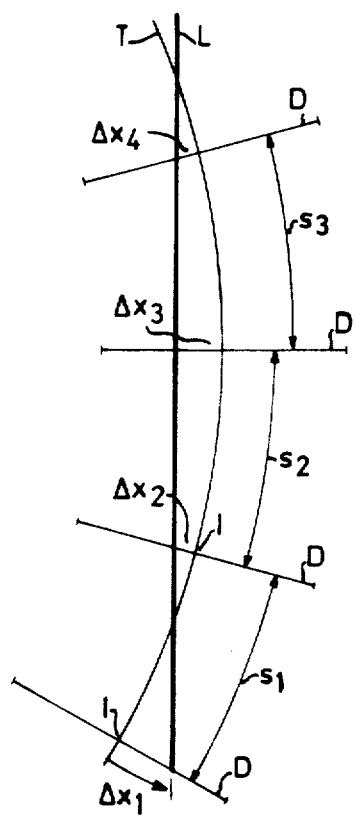
FIG. 1, which has already been referred to, shows in principle a marking and a vehicle path.
Figure 2:
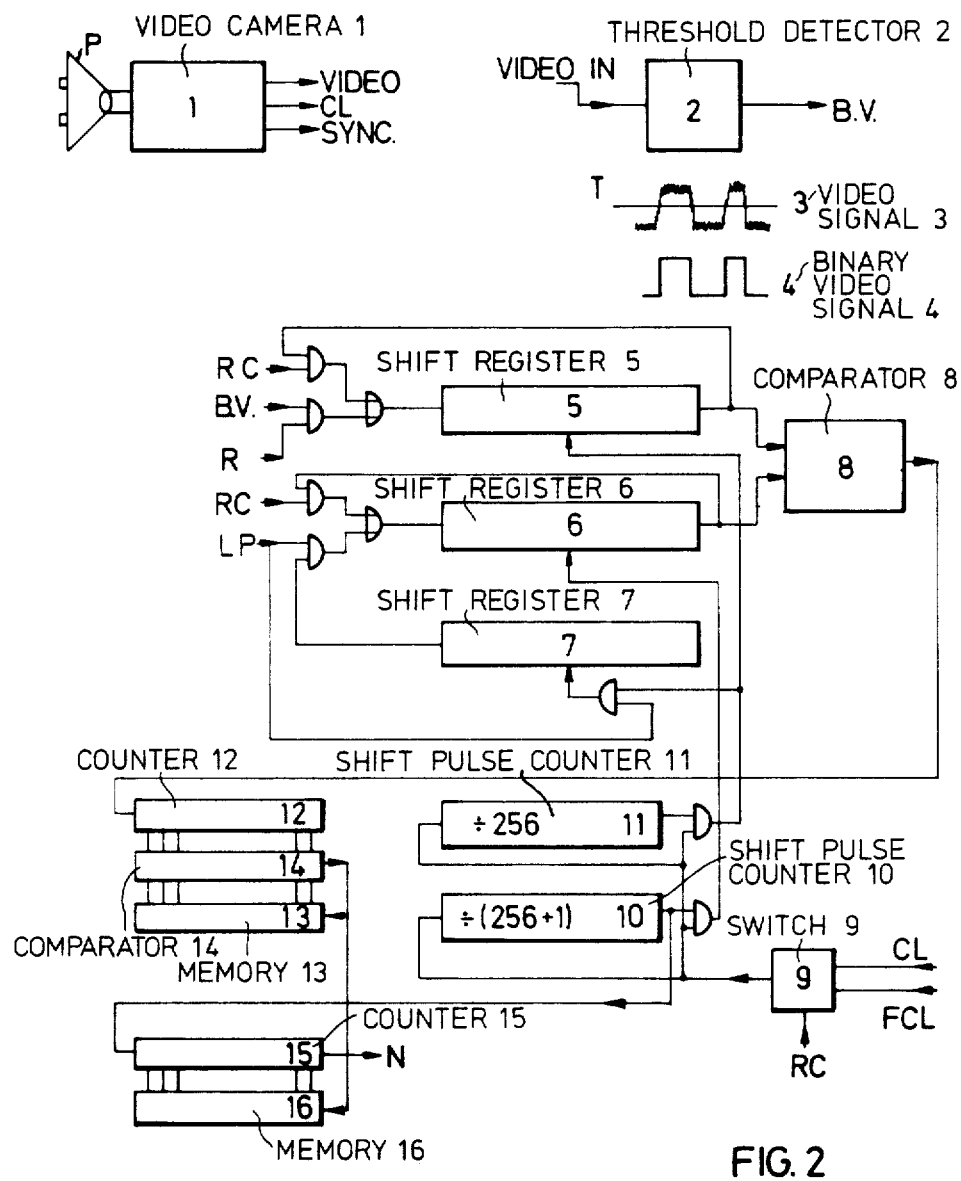
FIG. 2 shows an electronic diagram for a linear detector with recognition circuits.

FIG. 2 shows schematically an example of a device for recognizing the position on the floor of a line pattern. A video camera 1 is directed towards the floor, which displays the linear pattern P transverse to the camera. The video camera 1 is suitably a single-row photodiode matrix, e.g. manufactured by Reticon, and divides a line into 256 elements. A video signal is emitted, consisting of an analog signal for each element. The video signals are conducted to a threshold detector 2, which emits binary signals; i.e. 256 bits are emitted, which are 0 or 1 depending on if the intensity is sufficient to indicate the presence of the marking in the photo-element. 3 represents a video signal prior to digitalization, with the threshold value T drawn in, and 4 shows the resulting binary video signal. This signal, designated BV, is read in via a gate system into a binary shift register 5 with 256 bits. An ideal pattern, corresponding to the expected configuration (here two lines of different width) is read into a pattern memory 7. To determine lateral deviation, a correlation operation is now carried out.

If the pattern of the video signal is "centered" in the camera, shift register 5 and shift register 7 should in principle contain identical bit series. Through a special comparison which will be described, a lateral deviation can be determined.

As can be seen from FIG. 2, there are two different clock signals, namely the signal CL coming from the camera 1 and synchronized with the video signal, and a fast clock signal FCL which is used for transferring and coordinating purposes. For reading the video signal BV into the shift register 5, the signal CL is used, which is introduced via the switch 9, and under the control of a shift-pulse counter 11, which shuts off when all of the 256 bits have been read in, and under the control of a control signal R.

For comparison, the fast clock signal FCL is led under the control of the shift-pulse counter 11 to the clock input on the shift register 5 and under the control of the shift-pulse counter 10 to the clock input on the shift register 6. The signals coming from the shift registers each go to an individual input of a comparator 8, and are also recirculated under the control of a recirculating signal RC, so as to circulate the respective shift register. For each bit pair, the comparator sends a signal upon agreement, and the agreement signals are counted in a counter 12, which is provided with parallel outputs coupled to a comparator 14, which is also coupled to a memory 13.

Due to the fact that the shift-pulse counter 10 has the division factor (256+1), it will send an out-signal one pulse later, so that the shift register 6 will be shifted one pulse for each circulation. This pulse number 257 continues to a pulse counter which counts the number of separate comparisons, and after 256 cycles sends a stop signal.

For each loop, the number of agreements signalled from the comparator 8 is counted, and if the number of agreements exceeds the number stored in the memory 13, the circuit 14 will bring the higher number to the memory 13. At the same time the number in the counter 15 is taken into the memory 16. When the pulse counter 15 is full, when 256 comparisons have been made, there will be a number in the memory 16 which corresponds to the displacement between the shift registers 5 and 6 which produces the best agreement. It is then known how the pattern P lies in relation to the scanning field of the camera 1, at the same time as a ready-signal N is emitted from the pulse counter 15.

It is obvious that the control signals must be taken from a separate control unit which determines the operational sequence by sending signals R and LP at the beginning of each sampling sequence and then requesting a comparison by the signal RC. The sampling result can then be taken from the memory 16 as a measure of the lateral error; for example so that the number 128 designates that the camera/vehicle is directly over the marking (the position of the index point), a lower number indicating a lateral deviation to the left and a higher number a lateral deviation to the right of the index point.

Although this description of the sequence is quite schematic, it will enable the electronics engineer familiar with microcircuits to construct with standard components a suitable apparatus. After having described the principle method for recognition of markings, a few words should be said concerning redundance methods. It is obvious that the pattern may be misread at some time, sometimes because something else is mistaken for the pattern. One should note, however, that in the circulation according to FIG. 2, after comparison between the pattern in the memory 7 and the image in the memory 5, a number will be stored in the counter 13, which will be a sort of quality factor number. It is then possible to reject or accept measurements depending on whether this quality factor number exceeds a certain threshold value. In a compensation method based on the least-squares method, it is also possible to use the quality factor numbers as weighting numbers.

Instead of using successively incoming measured values, it is also possible to use sliding averages, both for determining the lateral deviation of the vehicle and its attitude. A person skilled in statistical methods will be able using such principles to formulate suitable computer programs without difficulty, when he has knowledge of the principle of the invention. The principle chosen depends largely on the computer capacity which one wishes to incorporate into the apparatus. Significant savings can be achieved in this respect by taking sliding averages.

Figure 3:
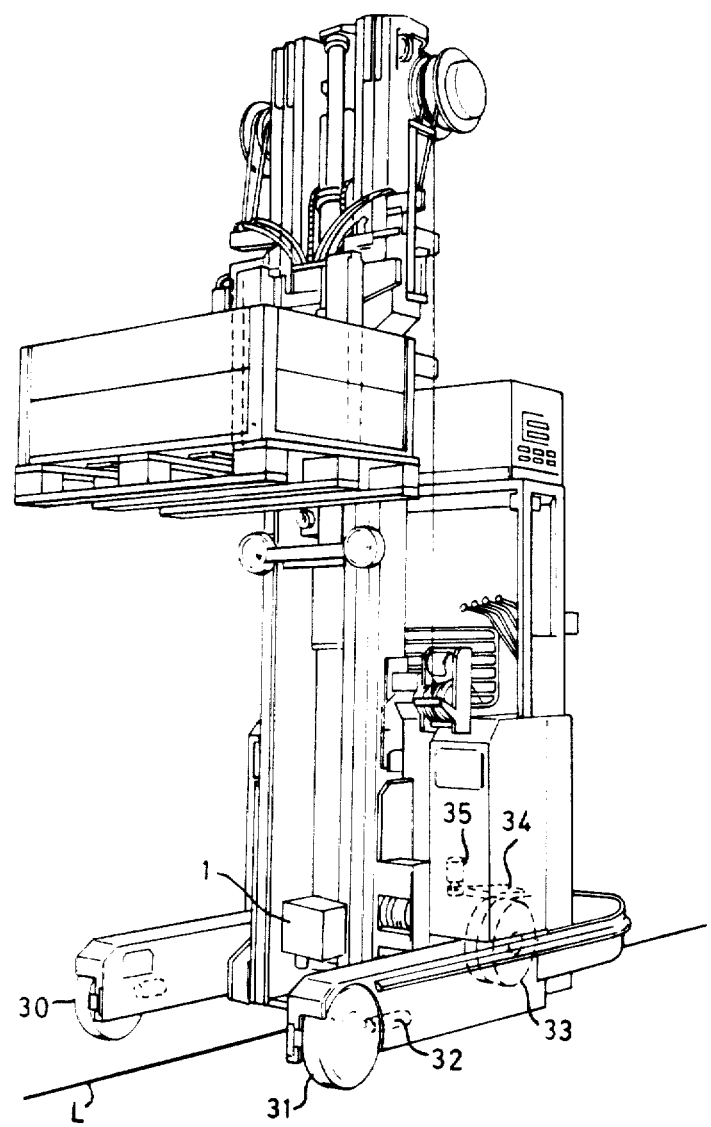
FIG. 3 shows a steerable truck.

FIG. 3 shows a steerable wheeled vehicle in the form of a fork-lift truck which runs on wheels 30, 31 and 33, of which wheel 33 is steerable by means of arrangements 34 and 35. The linear detector 1 according to the invention is mounted so that it senses the path marking L. Sensors 32 are placed at the unsteered wheels, to sense the rotation of the respective wheels. The sensors are magnetic and sense the passage of teeth on toothed rims on the wheels, whereby the distance travelled can be determined. The steering according to the invention is effected by setting a steering angle, computed according to equation (2), for the wheel 33 by means of the arrangements 34 and 35.

When, as in the example shown, the rolled-off measurement is arranged on two different wheels, it is suitable to take, as a measure of the distance between two positions of the vehicle, an average between the measured distances from the wheels 30 and 31.

What I claim is:

1. A method for steering a steerable vehicle along a linear path marking (1), there being arranged in the vehicle a linear detector (3) rigidly mounted in the vehicle essentially perpendicular to the principal direction of movement of the vehicle, said vehicle including at least one wheel providing a steering angle for the vehicle, comprising:

sensing the linear path marking at two successive positions along the path of said vehicle for determining the deviation of the linear marking from an index point on the linear detector, constituting two lateral deviation determinations $\Delta x_1$ and $\Delta x_2$;

measuring the distance $\Delta s$ between the different positions;

measuring the attitude angle $\psi_1$ between the linear path marking and the vehicle from the difference $\Delta x_2 - \Delta x_1$ divided by the travelled distance s;

determining a third lateral deviation $\Delta x_3$ at a measured distance $s_3$ from the last of said successive positions;

determining a new attitude angle $\psi_2$ using $\Delta x_3 - \Delta x_2$ and $s_3$; and entering said values $\psi_1$, $\psi$hd 2, $\Delta x_3$, $\Delta x_2$ and a value $\Delta t_3$ for the time passed in traversing distance $s_3$ in a steering equation $$\delta = a\psi_2 + b\frac{\psi_2 - \psi_1}{\Delta t_3} + c\Delta x_3 + d\frac{\Delta x_3 - \Delta x_2}{\Delta t_3} + e\psi_2.$$

where a, b, c and d are constants and e is a constant $e_o$ when $\Delta x_3$ and $\psi_2$ have the same sign and is otherwise zero, whereby the calculated value $\delta$ is used for setting said steered one wheel of the vehicle; and steering said vehicle one wheel to provide a steering angle $\delta$.

* * * * *